United States Patent [19]

Fujii et al.

[11] Patent Number: 4,558,214

[45] Date of Patent: Dec. 10, 1985

[54] TRANSMISSION ILLUMINATION DEVICE IN A PICTURE SCANNING DEVICE

[75] Inventors: Teruo Fujii; Mikizo Katsuyama, both of Kyoto, Japan

[73] Assignee: Dainippon Screen Seizo Kabushiki Kaisha, Japan

[21] Appl. No.: 529,605

[22] Filed: Sep. 6, 1983

[30] Foreign Application Priority Data

Oct. 4, 1982 [JP] Japan .................. 57-174158

[51] Int. Cl.⁴ .............................................. H01J 3/14
[52] U.S. Cl. ..................... 250/216; 358/206
[58] Field of Search ............... 356/404, 443, 444; 358/203, 206; 355/7, 41; 250/216, 234, 562, 563, 572, 237 R

[56] References Cited

U.S. PATENT DOCUMENTS

3,170,367  2/1965  Wick ............................ 355/44
3,635,135  1/1972  Ambraschka et al. ......... 356/443

*Primary Examiner*—David C. Nelms
*Assistant Examiner*—J. Gatto
*Attorney, Agent, or Firm*—Hayes, Davis & Soloway

[57] ABSTRACT

Disclosed is an improved transmission illumination device for use in a picture scanning device such as an electronic picture scanner which can illuminate an annular region around an illuminated spot. This annular illuminated spot is produced by using an annular convex lens as part of an optical system. Since the area surrounding the illuminated spot is also illuminated, finding a desired spot on an original picture is greatly facilitated. Having an illuminated annular region does not create any problem which may arise from flare light if an iris diaphragm is provided in a light receiving head for the exclusion of the light emitted from the illuminated annular area.

4 Claims, 6 Drawing Figures

TRANSMISSION ILLUMINATION DEVICE IN A PICTURE SCANNING DEVICE

This invention relates to a transmission illumination device for use in a picture scanning device and in particular to such a device which can produce an illuminated spot surrounded by an illuminated annular region on an original picture.

In processing an original picture on a picture scanning device such as an electronic color scanner, it is often necessary to observe a certain spot on the original picture for the purpose of identifying a certain strategic point on the original picture. For instance, it is often necessary to determine the highlight and shadow points on an original picture and to locate the coordinate of a certain meaningful point on an original picture.

However, since a conventional transmission illumination device for a picture scanning device has an extremely small illumination area normally less than 1 mm in diameter, it is very difficult to accurately illuminate a desired point on the original picture.

In view of such an inconvenience of conventional transmission illumination devices, a primary object of this invention is to provide an improved transmission illumination device for a picture scanning device which is free from the above-described inconvenience.

This invention is based on the recognition that by producing an illuminated spot which is surrounded by an illuminated annular area the determination and the identification of a certain point of an original picture may be greatly facilitated since the viewer can see the area surrounding the illuminated spot.

According to this invention, the above-mentioned primary object of this invention can be accomplished by providing a transmission illumination device in a picture scanning device, comprising a lamp house disposed in an original picture drum and is moveable along an axial direction in synchronization with a light receiving head which moves along the axial direction on the exterior of the original picture drum, the lamp house comprising a lamp, an annular convex lens and a condenser lens, thereby producing on an original picture on the original picture drum an illuminated region consisting of an illuminated spot and an annular illuminated area surrounding the illuminated spot.

Now this invention is described in the following. Other objects and advantages of this invention will become more apparent from the following description taken in conjunction with the accompanying drawings, in which.

Figure 1:
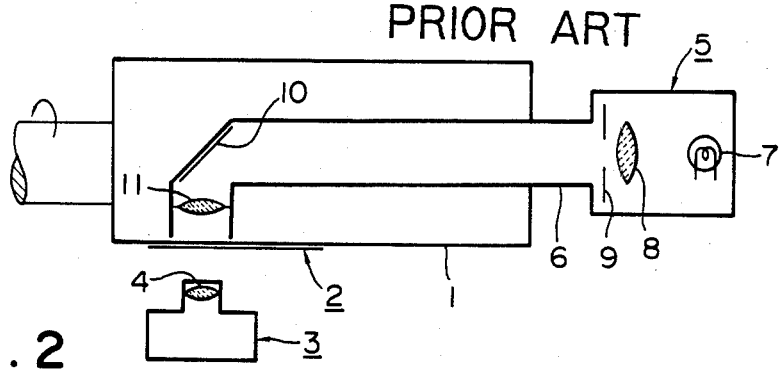
FIG. 1 is a schematic view of a conventional transmission illumination device.
Figure 2:
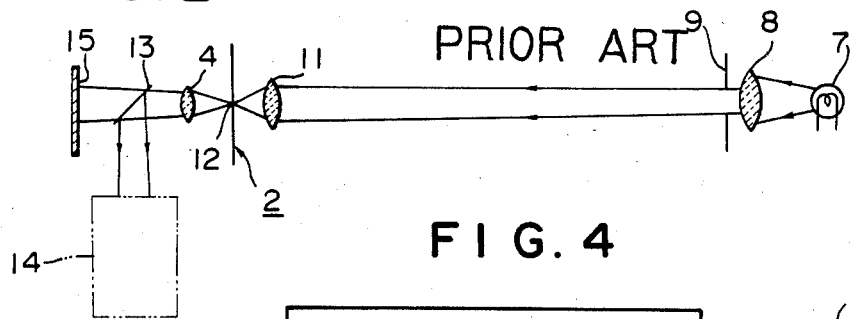
FIG. 2 is a diagram showing the optical structure of the conventional device shown in FIG. 1.
Figure 3:
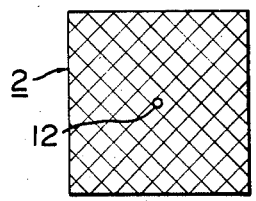
FIG. 3 is a front view of an original picture mounted on an original picture drum illuminated by the conventional device.

In the conventional device shown in FIG. 1, the original picture 2 is mounted on an original picture drum 1 and a light receiving head 3 equipped with a light receiving lens 4 is provided opposite to the original picture 2.

A lamp house 5 is provided next to the original picture drum 1 and an extension 6 of the lamp house 1 extends into the interior of the original picture drum 1 and its free end is positioned opposite to the light receiving head 3. The original picture drum 1 is adapted to rotate about its axial center line while the lamp housing 5 is adapted to linearly move along the central axial line in synchronization of the motion of the light receiving head 3.

The light emitted from a lamp 7, after passing through a condenser lens 8 and an iris diaphragm 9, travels through the extension 6 of the lamp housing 5. The light is then reflected at right angle by a mirror 10 and directed to the free end of the extension 6 which opposes the light receiving head 3, after passing through another condenser lens 11.

The light transmitted through an illuminated spot 12 on the original picture 2 passes through the light receiving lens 4 of the light receiving head 3 and, after being partially reflected by a half-mirror 13 to a diagonal direction, enters a color separation device 14 which includes an iris diaphragm, a dichroic mirror and an electronic photomultiplier which are not shown in the drawings.

The illuminated spot 12 may be viewed on a viewer 15 at a magnified scale from the portion of the light which has passed through the half-mirror 13.

Since the illuminated spot 12 must be very small in the order of 1 mm in diameter for preventing the generation of flare light which adversely affects the action of the color separation device 14 which makes use of an electronic photo-multiplier, it is often very difficult to determined the desired spot due to the fact that the area surrounding the illuminated spot is almost in total darkness.

The transmission illumination device of this invention can eliminate this inconvenience of conventional transmission illumination devices by expanding the visible area on a viewer without producing the unfavorable influence from flare light on color separation.

In the following description, those parts identical to those in the above-described conventional device are denoted with same numerals.

Figure 4:
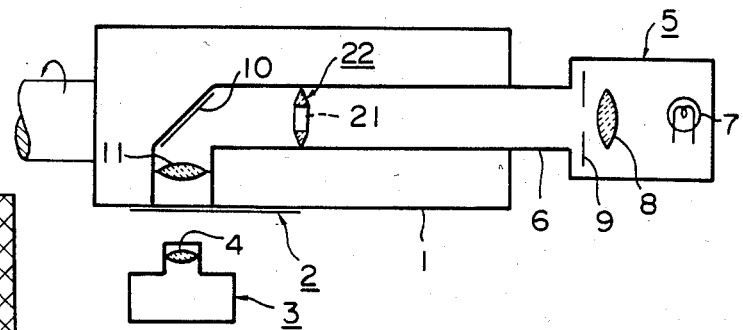
FIG. 4 is a schematic view of an embodiment of the transmission illumination device according to this invention.

As schematically illustrated in FIG. 4, the device of this invention is provided with an annular convex lens 22 with a through hole 21 in its center within the extension 6 of the lamp housing 5.

Figure 5:
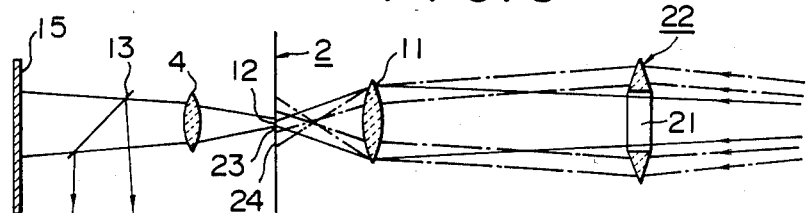
FIG. 5 is a diagram showing the optical structure of the device shown in FIG. 4.

According to this illustrated device, the light of the lamp 7, after passing through the through hole 21 of the annular convex lens 22, illuminates a minimum area of an original picture 2 on the original picture drum 1, and forms an illuminated spot 12, much in the same way as in the conventional device, as indicated by a solid line in FIG. 5, and is color separated at a color separation device 14 without any particular problem.

Figure 6:
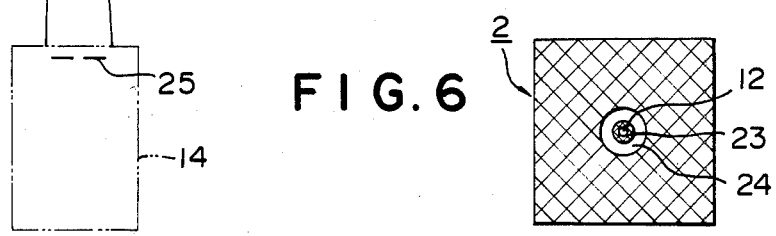
FIG. 6 is a front view of an original picture mounted on an original picture drum illuminated by the device according to this invention shown in FIG. 4.

And, as indicated by a chain dot line in FIG. 5, the light of the lamp 7 that has passed the annular portion of the annular convex lens 22 illuminates an annular region 24 of the original picture 2 around the illuminated spot 12 in a concentric manner interposing a dark annular region 23 therebetween as shown in FIG. 6. As a result, the original picture is illuminated over the annular region 23 in addition to the illuminated spot 12 itself.

This illuminated annular region 23 may be shielded at the color separation device by appropriately adjusting an iris diaphragm 25 without causing any unfavorable influences from the generation of flare light.

As described above, according to this invention, an original picture may be illuminated over an area greater than that is possible with a conventional device and a desired point of the original picture 2 may be projected onto the viewer 15 for observation. Therefore, it becomes easier to extract any set-up points or highlight and shadow points from the original picture for subsequent picture processing.

Although the present invention was described in terms of a specific embodiment, it is obvious to a person skilled in the art that various additions and modifications are possible in the implementation of the invention without departing from the spirit of this invention which is fully set out in the appended claims.

What is claimed is:

1. A transmission illumination device in a picture scanning device, comprising:
    a lamp house disposed in an original picture drum and is moveable along an axial direction in synchronization with a light receiving head which moves along the axial direction on the exterior of the original picture drum,
    the lamp house comprising a lamp, an annular convex lens and a condenser lens, thereby producing on an original picture on the original picture drum an illuminated region consisting of an illuminated spot and an annular illuminated area surrounding the illuminated spot.

2. A transmission illumination device as defined in claim 1, wherein the light receiving head comprises a viewer thereon.

3. A transmission illumination device as defined in claim 2, wherein the light receiving head is connected to a color separation device which is provided with an iris diaphragm which can shield the illuminated annular area.

4. A transmission illumination device as defined in claim 3, wherein the color separation device comprises an electronic photo-multiplier.

* * * * *